(12) United States Patent
Mizuguchi

(10) Patent No.: US 8,890,714 B2
(45) Date of Patent: Nov. 18, 2014

(54) RADIO APPARATUS THAT RECEIVES SIGNALS CONTAINING PREDETERMINED INFORMATION

(71) Applicant: Sanyo Electric Co., Ltd., Moriguchi (JP)

(72) Inventor: Takao Mizuguchi, Aichi (JP)

(73) Assignee: Sanyo Electric Co., Ltd., Moriguchi-Shi, Osaka (JP)

( * ) Notice: Subject to any disclaimer, the term of this patent is extended or adjusted under 35 U.S.C. 154(b) by 0 days.

(21) Appl. No.: 13/954,564

(22) Filed: Jul. 30, 2013

(65) Prior Publication Data
US 2013/0314253 A1 Nov. 28, 2013

Related U.S. Application Data

(63) Continuation of application No. PCT/JP2011/007083, filed on Dec. 19, 2011.

(30) Foreign Application Priority Data

Feb. 23, 2011 (JP) .................................. 2011-037673

(51) Int. Cl.
G08G 1/09 (2006.01)
G08G 1/16 (2006.01)
G08G 1/0967 (2006.01)
H04B 17/00 (2006.01)

(52) U.S. Cl.
CPC .......... *G08G 1/096791* (2013.01); *G08G 1/161* (2013.01); *H04B 17/0067* (2013.01); *G08G 1/096716* (2013.01); *H04B 17/007* (2013.01); *G08G 1/096783* (2013.01); *H04B 17/0057* (2013.01)
USPC ......................................... 340/905; 340/903

(58) Field of Classification Search
USPC ............ 340/905, 903, 436; 455/500; 701/23, 701/301, 117
IPC ................... H04W 52/367,24/00; G01S 13/758
See application file for complete search history.

(56) References Cited

U.S. PATENT DOCUMENTS

| 7,302,321 | B2 | 11/2007 | Suzuki et al. |
| 2010/0312432 | A1 | 12/2010 | Hamada et al. |
| 2012/0028662 | A1* | 2/2012 | Nagai et al. .................. 455/500 |

FOREIGN PATENT DOCUMENTS

| CN | 101926198 A | 12/2010 |
| JP | 2002-074593 A | 3/2002 |

(Continued)

OTHER PUBLICATIONS

International Search Report issued in International Application No. PCT/JP2011/007083 dated Jan. 31, 2012.

(Continued)

*Primary Examiner* — Shirley Lu
(74) *Attorney, Agent, or Firm* — McDermott Will & Emery LLP

(57) ABSTRACT

An RF unit and a modem unit receive packet signals. A processing unit processes the received packet signals. A measurement unit measures the received power of the packet signals received. A monitoring unit monitors the variation in the received power of the packet signals measured by the measurement unit. When the received power increases in such a manner that the variation monitored by the monitoring unit is larger than a threshold value, a notification unit starts to convey information reflecting the content of the packet signals processed by the processing unit.

6 Claims, 15 Drawing Sheets

(56) References Cited

FOREIGN PATENT DOCUMENTS

| | | |
|---|---|---|
| JP | 2004-206624 A | 7/2004 |
| JP | 2004-310315 A | 11/2004 |
| JP | 2005-202913 A | 7/2005 |
| JP | 2008-070995 A | 3/2008 |
| JP | 2010-178231 A | 8/2010 |
| WO | 2010-087187 A1 | 8/2010 |

OTHER PUBLICATIONS

English translation of Chinese Search Report issued in Chinese Application No. 201180066470.2, dated Jul. 10, 2014.

* cited by examiner

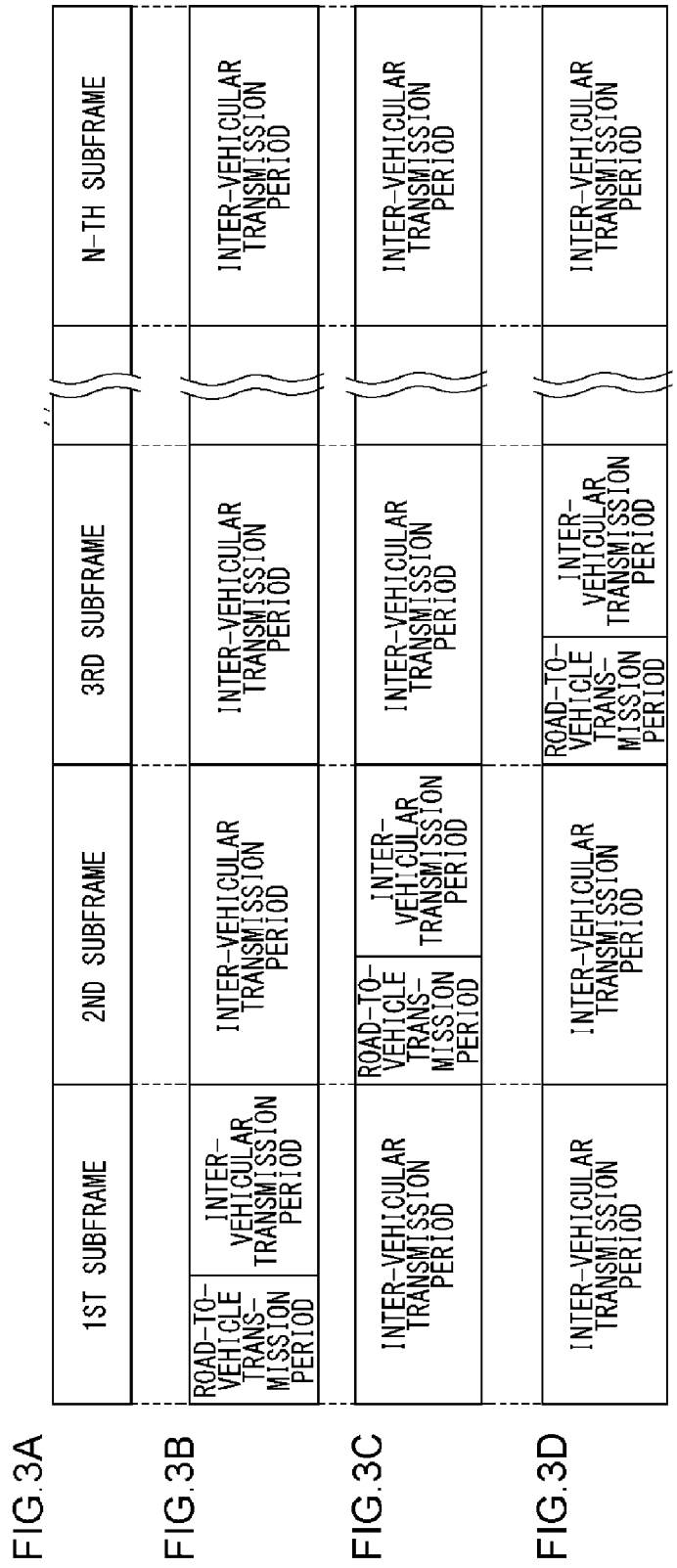

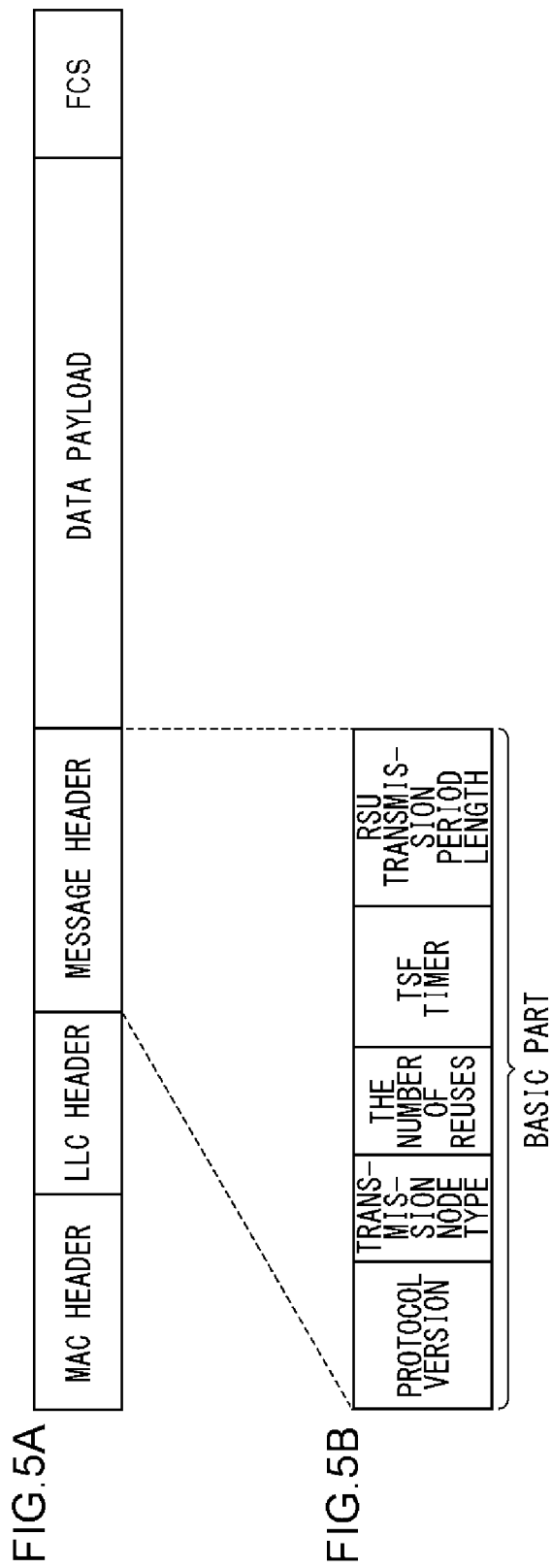

RADIO APPARATUS THAT RECEIVES SIGNALS CONTAINING PREDETERMINED INFORMATION

RELATED APPLICATIONS

This application is the continuation of International Application No. PCT/JP2011/007083, filed on Dec. 19, 2011, which in turn claims the benefit of Japanese Application No. 2011-037673, filed on Feb. 23, 2011, the disclosures of which Applications are incorporated by reference herein.

BACKGROUND OF THE INVENTION

1. Field of the Invention

The present invention relates to a communication technology, and it particularly relates to a radio apparatus that receives signals containing predetermined information.

2. Description of the Related Art

Road-to-vehicle communication has been under investigation in an effort to prevent collision accidents of vehicles on a sudden encounter at an intersection. In a road-to-vehicle communication, information on conditions at an intersection is communicated between a roadside unit and an in-vehicle unit. Such a road-to-vehicle communication requires installation of roadside units, which means a great cost of time and money. In contrast to this, a vehicle-to-vehicle (inter-vehicular) communication, in which information is communicated between in-vehicle units, has no need for installation of roadside units. In that case, current position information is detected in real time by GPS (Global Positioning System) or the like, for instance, and the position information is exchanged between the in-vehicle units. Thus it is determined on which of the roads leading to the intersection the driver's vehicle and the other vehicles are located. In order to warn the owner of a mobile terminal that a moving object is approaching him/her, the signals sent from the moving object are received by the mobile terminal. For example, the mobile terminal detects the presence of the moving object from the received signals and measures the distance between his/her own mobile terminal and the moving object, based on the receiving strength of the signals.

It is desired that such warning be given as early as possible.

SUMMARY OF THE INVENTION

The present invention has been made in view of the foregoing circumstances, and a purpose thereof is to provide a technology of sending a notification about the presence of a terminal apparatus (a radio apparatus) that is at high risk.

In order to resolve the above-described problems, a radio apparatus according to one embodiment of the present invention includes: a receiving unit for receiving a packet signal sent from another radio apparatus; a processing unit for processing the packet signal received by the receiving unit; a measurement unit for measuring a received power of the packet signal received by the receiving unit; a monitoring unit for monitoring a variation in the received power measured by the measurement unit; and a notification unit for sending a notification such that, when the received power measured by the measurement unit is smaller than a first threshold value and when the received power increases in such a manner that the variation monitored by the monitoring unit is larger than a second threshold value, the notification unit starts to convey information reflecting content of the packet signal processed by the processing unit, and when the received power measured by the measurement unit is larger than or equal to the first threshold value, the notification unit starts to convey the information reflecting content of the packet signal processed by the processing unit, regardless of the variation monitored by the monitoring unit.

Optional combinations of the aforementioned constituting elements, and implementations of the invention in the form of methods, apparatuses, systems, recording media, computer programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A to 3D each shows a format of frame defined in the communication systems of FIG. 1;

FIGS. 5A and 5B each shows a format of MAC frame stored in a packet signal defined in the communication system of FIG. 1;

DETAILED DESCRIPTION OF THE INVENTION

Figure 1:
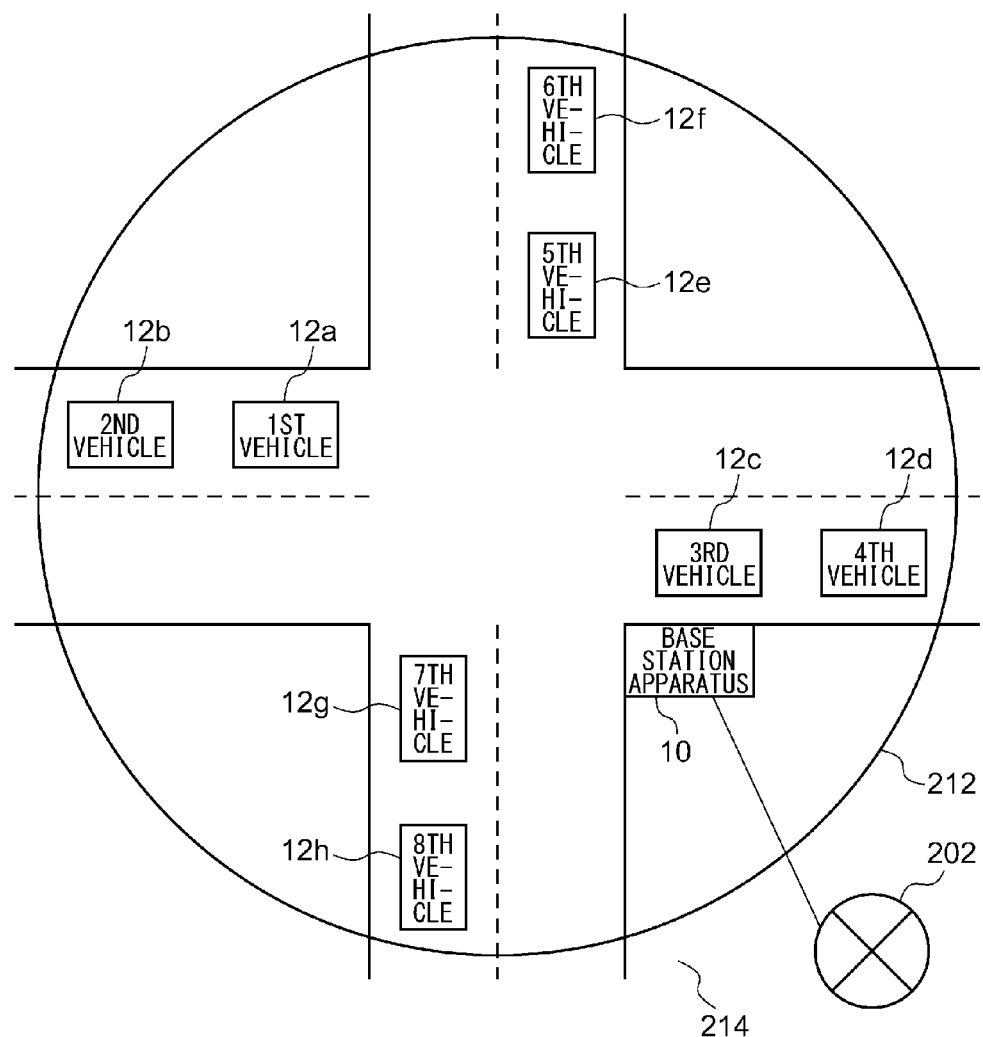
FIG. 1 shows a structure of a communication system according to an exemplary embodiment of the present invention.

The invention will now be described by reference to the preferred embodiments. This does not intend to limit the scope of the present invention, but to exemplify the invention.

Our knowledge underlying the present invention will be explained before exemplary embodiments of the present invention are explained in detail. An access control function called CSMA/CA (Carrier-Sense Multiple Access with Collision Avoidance) is used in wireless LAN (Local Area Network) compliant with a standard such as IEEE 802.11. Thus, the same radio channel is shared by a plurality of terminal apparatuses. In such a scheme as CSMA/CA, a packet signal is transmitted after it has been verified by carrier sense that other packet signals are not being transmitted. Here, when wireless LAN is applied to the inter-vehicular communication such as ITS (Intelligent Transport Systems), a need arises to transmit information to a large indefinite number of terminal apparatuses, and therefore it is desirable that signals be transmitted by broadcast. As a result, a terminal apparatus detects the approach of another vehicle by receiving the signals sent by broadcast. The terminal apparatus conveys this information to a driver, thereby alerting the driver for the purpose of preventing collision accidents between vehicles.

It is desired that not only the collision accidents of vehicles but also the collision accidents between a pedestrian or the like and a vehicle be prevented. To cope with this, not only a terminal apparatus is mounted on the vehicle but also a terminal apparatus is carried by the pedestrian. In order to prevent the pedestrian from being hit by the vehicle, the terminal apparatus carried by the pedestrian conveys to the in-vehicle terminal apparatus the location where the terminal apparatus carried by the pedestrian is at present. As the number of terminal apparatuses carried by pedestrians increases, the frequency of giving warnings to the terminal apparatus mounted on the vehicle (in-vehicle terminal apparatus) gets higher. As a result, the effect of giving an early warning is small. To cope with this, the in-vehicle terminal apparatus outputs a warning only if the received power is large. This is based on the idea that a pedestrian who is present near the vehicle is at a higher risk of being hit by the vehicle. Nevertheless, there may be a high risk of accident even though the received power is small. For example, consider a case where a pedestrian, who was not seen by the driver a moment ago, is now in the driver's sight line. Under such circumstances, it is desirable that the driver be given a warning as early as possible.

The present exemplary embodiments will be outlined before the present invention is explained in detail. Exemplary embodiments of the present invention relate to a communication system that carries out not only an inter-vehicular communication between terminal apparatuses mounted on vehicles but also a road-to-vehicle communication from a base station apparatus installed in an intersection and the like to the terminal apparatuses. As the inter-vehicular communication, a terminal apparatus transmits, by broadcast, a packet signal in which the information such as the traveling speed and position of a vehicle is stored (hereinafter such information will be referred to as "data" also). And the other terminal apparatuses receive the packet signals and recognize the approach or the like of vehicle(s) based on the data. Notifying the driver of the approach of vehicle(s) alerts the driver. To reduce the interference between the inter-vehicular communication and the road-to-vehicle communication, the base station apparatus repeatedly specifies a frame that contains a plurality of subframes. To perform the road-to-vehicle communication, the base station apparatus selects any of the plurality of subframes and transmits, by broadcast, a packet signal that contains control information and the like, in a period of a beginning part of the selected subframe. The control information contains information regarding a time length required for the transmission of the packet signal by broadcast from the base station apparatus (hereinafter this time length will be referred to as "road-to-vehicle transmission period").

The terminal apparatus identifies the road-to-vehicle period based on the control information, and transmits the packet signal in a period other than the road-to-vehicle transmission period. Since in this manner the road-to-vehicle communication and the inter-vehicular communication are subjected to time-division multiplexing, the collision probability of packet signals in between the road-to-vehicle communication and the inter-vehicular communication is reduced. Note that the inter-vehicular communication is carried out in a period for the execution of inter-vehicular communication (hereinafter referred to as "inter-vehicular transmission period"), other than the road-to-vehicle transmission period, by use of the CSMA scheme. Such a terminal apparatus is carried by the pedestrian as well. The terminal apparatus carried by the pedestrian is battery-powered and requires a low power consumption. Thus the terminal apparatus carried by the pedestrian only transmits, by broadcast, the packet signals that store the data and does not notify the pedestrian of the approach of vehicle(s). As the number of pedestrian increases, the warning may continue to be outputted from the in-vehicle terminal apparatus, in which case the effect of early warning is reduced.

In order to cope with this problem, the terminal apparatus mounted on a vehicle (in-vehicle terminal apparatus) gives a warning about the presence of terminal apparatuses, whose received power is larger than or equal to a threshold value, among terminal apparatuses carried by pedestrians. Under such circumstances, there are cases where a pedestrian, who was not seen by the driver a moment ago, is now in the driver's sight line. In such a case, it is desirable that the driver be given a warning as early as possible even though the received power is smaller than the threshold value. Thus a terminal apparatus according to the present exemplary embodiment carries out the following processings. Note that, in the following description, even when the terminal apparatus carried by the pedestrian is used, the communication performed then may be expressed as "inter-vehicular communication" or "road-to-vehicle communication". The terminal apparatus receives packet signals. The terminal apparatus measures the received power of the packet signals and monitors the variation in the received power. When the received power increases in such a manner that the variation is larger than the threshold value, the terminal apparatus outputs a warning.

FIG. 1 shows a structure of a communication system 100 according to an exemplary embodiment of the present invention. FIG. 1 corresponds to a case of the communication system 100 at an intersection viewed from above. The communication system 100 includes a base station apparatus 10, a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are generically referred to as "vehicle 12" or "vehicles 12", and a network 202. It is to be noted that each vehicle 12 has a not-shown terminal apparatus installed therein. Also, an area 212 is formed around the base station apparatus 10, and an almost-unreachable area 214 is formed outside the area 212.

As shown in FIG. 1, a road extending in the horizontal, or left-right, direction and a road extending in the vertical, or up-down, direction in FIG. 1 intersect with each other in the central portion thereof. Note here that the upper side of FIG. 1 corresponds to the north, the left side thereof the west, the down side thereof the south, and the right side thereof the east. And the portion where the two roads intersect each other is the intersection. The first vehicle 12a and the second vehicle 12b are advancing from left to right, while the third vehicle 12c and the fourth vehicle 12d are advancing from right to left. Also, the fifth vehicle 12e and the sixth vehicle 12f are advancing downward, while the seventh vehicle 12g and the eighth vehicle 12h are advancing upward.

In the communication system 100, the base station apparatus 10 is installed at the intersection. The base station apparatus 10 controls communications between the terminal apparatuses. The base station apparatus 10 repeatedly generates a frame containing a plurality of subframes, based on the signal received from not-shown GPS satellites and frames formed by the other base station apparatuses 10 (not-shown). Here, a definition is made such that the road-to-vehicle transmission period can be set to the leading part (beginning part) of each subframe. The base station apparatus 10 selects a subframe, in which the road-to-vehicle transmission period is not set by the other base station apparatuses 10, from among a plurality of subframes. The base station apparatus 10 sets the road-to-vehicle transmission period to the beginning part of the selected subframe. The base station apparatus 10 broadcasts the packet signal in the thus set road-to-vehicle transmission period. It is assumed that there are a plurality of kinds of data as data to be contained in the packet signal. One of such data is control information and another one of such data is traffic congestion information, for instance. Though the base station apparatus 10 receives the traffic congestion information from an external source, the description regarding this will be given later.

Each vehicle 12 is driven by an engine and installs a not-shown terminal apparatus. The terminal apparatus generates a frame based on the control information contained in the received packet signal. As a result, frames generated respectively by a plurality of terminal apparatuses are synchronized with a frame generated by the base station apparatus 10. The terminal apparatus carries out CSMA/CA and thereby broadcasts the packet signals in the inter-vehicular transmission periods. The terminal apparatus stores information, such as the information regarding the present location of the terminal apparatus, in the packet signal. The terminal apparatus also stores the control information in the packet signal. In other words, the control information transmitted from the base station apparatus 10 is transferred by the terminal apparatus. At the same time, terminal apparatuses that cannot receive the packet signals sent from the base station apparatus, namely those located in the almost-unreachable area 214, carry out CSMA/CA to broadcast their packet signals. Further, the terminal apparatus receives packet signals sent from other terminal apparatuses and thereby the approach of vehicles in which the other terminal apparatuses are installed is conveyed to the driver.

As mentioned already, the pedestrians carry their terminal apparatuses. Those terminal apparatuses carried by the pedestrians do not have the function capable of conveying the content of the received packet signals. Thus a terminal apparatus carried by each pedestrian broadcasts the information regarding his/her location, namely the location of the terminal apparatus carried by him/her, by storing said information in the packet signals. The packet signals broadcast from the terminal apparatus carried by the pedestrian are received by the terminal apparatuses mounted on the vehicles 12. The terminal apparatus mounted in the vehicle 12 (in-vehicle terminal apparatus) measures the received power of packet signals. If the received power thereof is greater than or equal to a predetermined threshold value (hereinafter referred to as "first threshold value"), the in-vehicle terminal apparatus of the vehicle 12 will alert the presence of a pedestrian. The terminal apparatus mounted in the vehicle 12 (in-vehicle terminal apparatus) monitors the variation in the received power of packet signals. If the received power thereof is less than the first threshold value but the received power thereof increases in such a manner that the variation in the received power thereof gets larger than a predetermined threshold (hereinafter referred to as "second threshold value"), the in-vehicle terminal apparatus of the vehicle 12 will alert the presence of a pedestrian. The former warning is given to alert a pedestrian located near the vehicle 12, whereas the latter warning is given to alert a pedestrian who is about to enter the driver's sight line from an unseen area by the driver.

Figure 2:
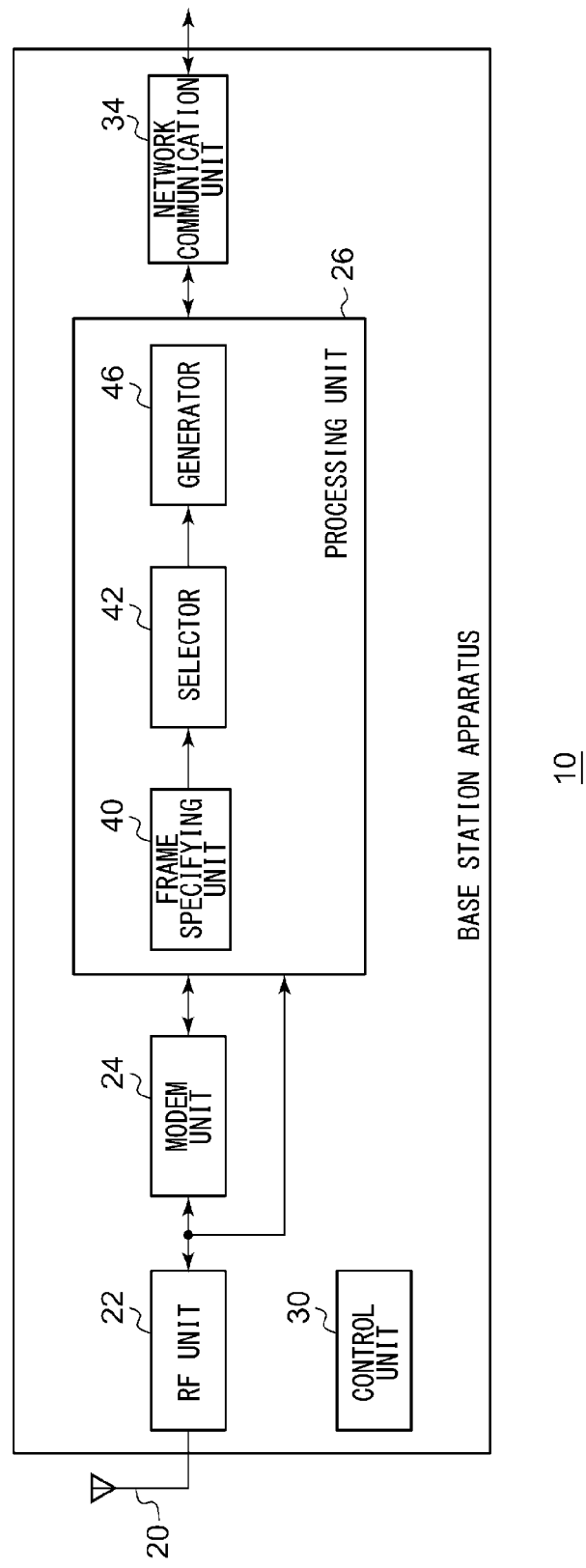
FIG. 2 shows a base station apparatus shown in FIG. 1.

FIG. 2 shows the base station apparatus 10. The base station apparatus 10 includes an antenna 20, an RF unit 22, a modem unit 24, a processing unit 26, a control unit 30, and a network communication unit 34. The processing unit 26 includes a frame specifying unit 40, a selector 42, and a generator 46.

As a receiving processing, the RF unit 22 receives, through the antenna 20, packet signals transmitted from terminal apparatuses and the other base station apparatuses 10 (not shown). The RF unit 22 performs a frequency conversion on the received packet signal of a radiofrequency and thereby generates a packet signal of baseband. Further, the RF unit 22 outputs the baseband packet signal to the modem unit 24. Generally, a baseband packet signal is formed of an in-phase component and a quadrature component, and therefore it should be represented by two signal lines. However, it is represented by a single signal line here to make the illustration clearer for understanding. The RF unit 22 also includes an LNA (Low Noise Amplifier), a mixer, an AGC (Automatic Gain control) unit, and an A/D converter.

As a transmission processing, the RF unit 22 performs a frequency conversion on the baseband packet signal inputted from the modem unit 24 and thereby generates a radiofrequency packet signal. Further, the RF unit 22 transmits, through the antenna 20, the radiofrequency packet signal in a road-to-vehicle transmission period. The RF unit 22 also includes a PA (Power Amplifier), a mixer, and a D-A converter.

As a receiving processing, the modem unit 24 demodulates the radiofrequency packet signal fed from the RF unit 22. Further, the modem unit 24 outputs the demodulation result to the processing unit 26. As a transmission processing, the modem unit 24 modulates the data fed from the processing unit 26. Further, the modem unit 24 outputs the modulation result to the RF unit 22 as a baseband packet signal. It is to be noted here that the communication system 100 is compatible with the OFDM (Orthogonal Frequency Division Multiplexing) modulation scheme and therefore the modem unit 24 performs FFT (Fast Fourier Transform) as a receiving processing and performs IFFT (Inverse Fast Fourier Transform) as a transmission processing also.

The frame specifying unit 40 receives signals from the not-shown GPS satellites and acquires information on the time of day based on the received signals. It should be noted that known art can be used for the acquisition of information on the time of day and therefore the description thereof is omitted here. The frame specifying unit 40 generates a plurality of frames based on the information on the time of day. For example, the frame specifying unit 40 generates ten "100 msec" frames by dividing a duration of "1 sec" into 10 parts starting from the timing indicated by the information on the time of day. Frames are thus defined and specified repeatedly through the repetition of this process. Note that the frame specifying unit 40 may detect the control information from the demodulation result and generate frames based on the detected control information. Such a processing as this corresponds to generating a frame synchronized with the timing of the frames formed by the other base station apparatuses 10. FIGS. 3A to 3D each shows a format of frame specified in the communication system 100. FIG. 3A shows a structure of each frame. Each frame is formed of N subframes denoted by a first subframe to an N-th subframe. For example, when each frame is 100 msec long and N is 8, the subframe of 12.5 msec in length (duration) is defined. A description of FIGS. 3B to 3D will be given later. Now, refer back to FIG. 2.

The selector 42 selects a subframe, with which to set the road-to-vehicle transmission period, from among a plurality of subframes contained in a frame. More to the point, the selector 42 receives a frame defined by the frame specifying unit 40. The selector 42 receives the input of demodulation results from the not-shown other base station apparatuses 10 or other terminal apparatuses via the RF unit 22 and the modem unit 24. The selector 42 extracts the demodulation result sent from the other base station apparatuses 10 from among the demodulation results inputted. The selector 42 identifies a subframe, which does not receive the demodulation result, by identifying the subframe that has received the demodulation result. This corresponds to identifying an unused subframe, namely, a subframe to which the road-to-vehicle transmission period is not set by the other base station apparatuses 10. If there are a plurality of unused subframes, the selector 42 will randomly select a single subframe. If there is no unused subframes, namely, if a plurality of subframes are all used respectively, the selector 42 will acquire the received power corresponding to the demodulation result and select preferentially a subframe whose received power is small.

FIG. 3B shows a structure of a frame generated by a first base station apparatus 10a. The first base station apparatus 10a sets a road-to-vehicle transmission period at the beginning of the first subframe. Subsequent to this road-to-vehicle transmission period, the first base station apparatus 10a sets an inter-vehicular transmission period in the first subframe. The inter-vehicular transmission period is a period during which a terminal apparatus can broadcast a packet signal. In other words, the subframes are defined such that the first base station apparatus 10a can broadcast the packet signal in the road-to-vehicle transmission period assigned to the beginning of the first subframe and such that the terminal apparatus can broadcast the packet signal in the inter-vehicular transmission period, other than the road-to-vehicle transmission period, in each frame. Further, the first base station apparatus 10a sets only the inter-vehicular transmission periods to the second to N-th subframes.

FIG. 3C shows a structure of a frame generated by a second base station apparatus 10b. The second base station apparatus 10b sets a road-to-vehicle transmission period at the beginning of the second subframe. The second base station apparatus 10b sets an inter-vehicular transmission period to the subsequent remaining period of the second subframe, and sets only the inter-vehicular transmission periods to the first subframe, the third to N-th subframes. FIG. 3D shows a structure of a frame generated by a third base station apparatus 10c. The third base station apparatus 10c sets a road-to-vehicle transmission period at the beginning of the third subframe. The third base station apparatus 10c sets an inter-vehicular transmission period to the subsequent remaining period of the third subframe, and sets only the inter-vehicular transmission periods to the first and second subframes and the fourth to N-th subframes. In this manner, a plurality of base station apparatuses 10 select mutually different subframes and set the road-to-vehicle transmission periods at the beginnings of the selected subframes, respectively. Now, refer back to FIG. 2. The selector 42 outputs the selected subframes to the generator 46.

Figures 4A, 4B:
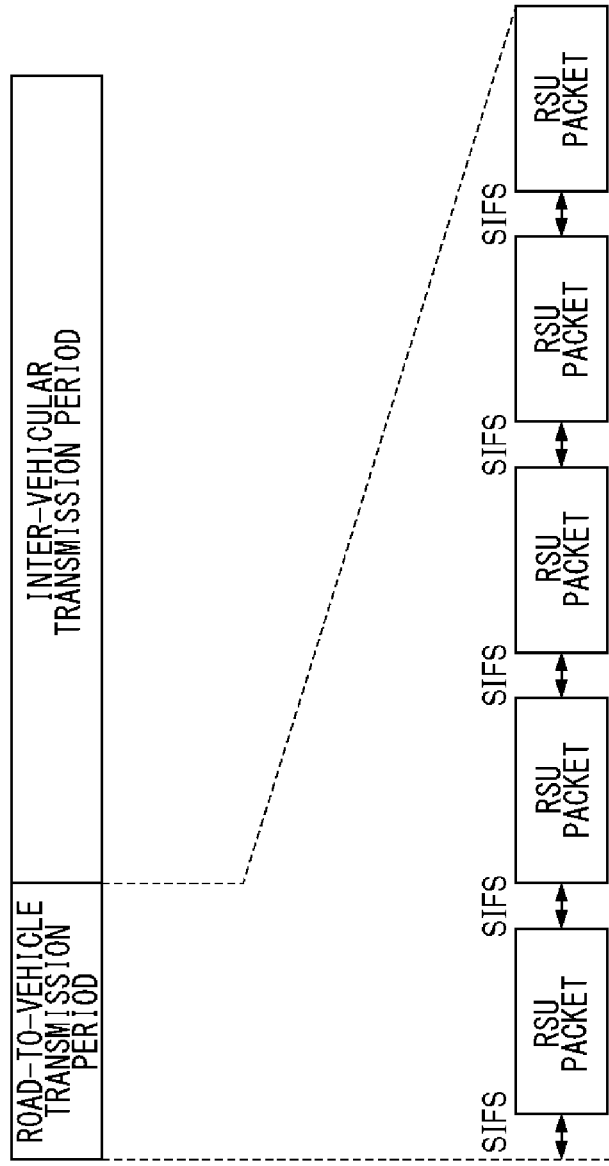
FIGS. 4A and 4B each shows a structure of subframe of FIGS. 3A to 3D.

The generator 46 sets the road-to-vehicle transmission period to the subframe that corresponds to the subframe number received from the selector, and generates RSU packet signals to be broadcast in the road-to-vehicle transmission period. In the following description, no distinction will be made between the terms "RSU packet signal" and "packet signal". FIGS. 4A and 4B each shows a structure of subframe. FIG. 4A shows a subframe in which a road-to-vehicle transmission period is set. As shown in FIG. 4A, each subframe is constituted of a road-to-vehicle transmission period and an inter-vehicular transmission period in this order. FIG. 4B shows an arrangement of packet signal in the road-to-vehicle transmission period. As shown in FIG. 4B, a plurality of RSU packet signals are arranged in the road-to-vehicle transmission period. It should be noted here that the previous and next packet signals are separated by a short interframe space (SIFS).

A description is given here of a structure of RSU packet signal. FIGS. 5A and 5B each shows a format of MAC (Message Authentication Code) frame stored in a packet signal defined in the communication system 100. FIG. 5A shows a format of MAC frame. The MAC frame is constructed such that "MAC header", "LLC (Logical Link Control) header", "message header", "data payload", and "FCS (Frame Check Sequence)" are assigned in this order starting from the beginning. The information contained in the data payload will be discussed later. FIG. 5B is a diagram showing a structure of message header generated by the generator 46. The message header includes a basic part.

The basic part includes "protocol version", "transmission node type", "the number of reuses", "TSF (Timing Synchronization Function) timer", and "RSU (Roadside Unit) transmission period length". The protocol version indicates a version of compatible protocol. The transmission node type indicates a sender of packet signal that contains the MAC frame. For example, "0" indicates a terminal apparatus, and "1" indicates the base station apparatus 10. When the selector 42 extracts the demodulation results sent from the other base station apparatuses 10 from the inputted demodulation results, the selector 42 utilizes the value of the transmission node type. The number of reuses indicates an index of validity in the case when the header message is transferred by the terminal apparatus. TSF timer indicates the transmission time. The RSU transmission period length indicates the time length of road-to-vehicle transmission period and therefore the RSU transmission period is said to serve as the information regarding the road-to-vehicle transmission period. Now, refer back to FIG. 2.

The network communication unit 34 connects to the not-shown network 202. The network communication unit 34 receives traffic congestion information from the network 202. The generator 46 acquires the traffic congestion information from the network communication unit 34 and generates the aforementioned RSU packet signals by storing the traffic congestion information in the data payload. The control unit 30 controls the entire processing of the base station apparatus 10.

These structural components may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 6:
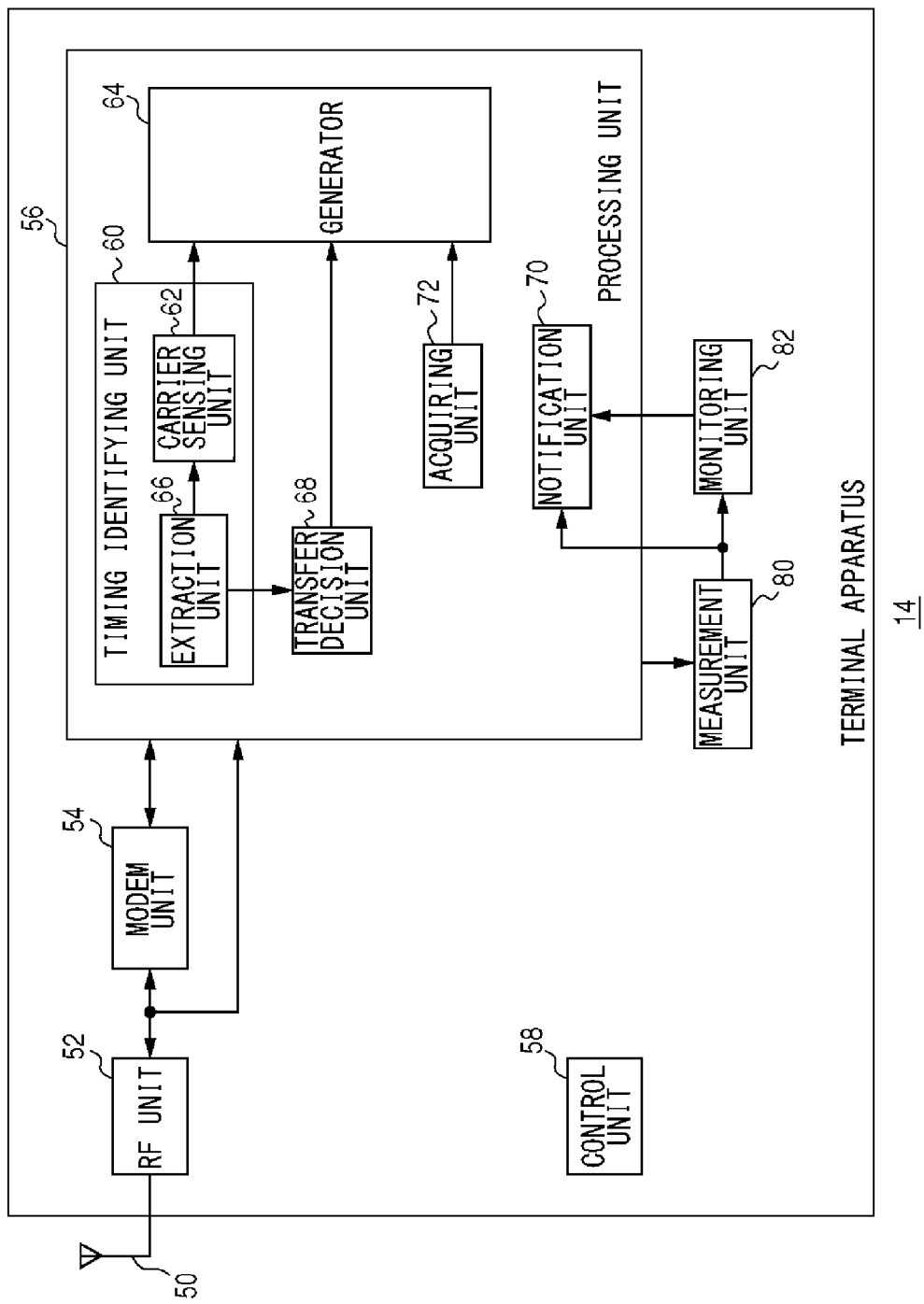
FIG. 6 shows a structure of a terminal apparatus mounted on a vehicle shown in FIG. 1.

FIG. 6 shows a structure of a terminal apparatus 14 mounted on a vehicle 12. The terminal apparatus 14 includes an antenna 50, an RF unit 52, a modem unit 54, a processing unit 56, a control unit 58, a measurement unit 80, and a monitoring unit 82. The processing unit 56 includes a generator 64, a timing identifying unit 60, a transfer decision unit 68, a notification unit 70, and an acquiring unit 72. The timing identifying unit 60 includes an extraction unit 66 and a carrier sensing unit 62. The antenna 50, the RF unit 52, and the modem unit 54 perform the processings similar to those of the antenna 20, the RF unit 22, and the modem unit 24 of FIG. 2, respectively. A description is therefore given here centering around features different from those of FIG. 2.

The modem unit 54 and the processing unit 56 receive the packet signals sent from the not-shown other terminal apparatuses 14 and the base station apparatus 10. As described earlier, the modem unit 54 and the processing unit 56 receive the packet signals, sent from the base station apparatus 10, in the road-to-vehicle transmission period. As described earlier, the modem unit 54 and the processing unit 56 receive the packet signals, sent from the other terminal apparatuses 14, in the inter-vehicular transmission period.

If the demodulation result relates to the packet signal sent from the not-shown base station apparatus 10, the extraction unit 66 will identify the timing of a subframe assigned to the road-to-vehicle transmission period. In so doing, the extraction unit 66 estimates that the terminal apparatus 14 is currently located within the area 212 of FIG. 1. The extraction unit 66 generates frames based on the timing of the subframe and the content of message header in the packet signal (more specifically, the content of RSU transmission period length). Since the frames may be generated similarly to the aforementioned frame specifying unit 40, the description thereof is omitted here. As a result, the extraction unit 66 generates a frame synchronized with the frame formed by the base station apparatus 10.

If, on the other hand, no RSU packet signals is being received, the extraction unit 66 will estimate that the terminal apparatus 14 is currently located in the almost-unreachable area 214. If it is estimated that the terminal apparatus 14 is located in the area 212, the extraction unit 66 will select an inter-vehicular transmission period. If it is estimated that the terminal apparatus 14 is located in the almost-unreachable area 214, the extraction unit 66 will select the timing unrelated to the frame construction. If the inter-vehicular transmission period is selected, the extraction unit 66 will output the timings of frame and subframes and the information on the inter-vehicular transmission period to the carrier sensing unit 62. As the extraction unit 66 selects the timing unrelated to the frame construction, the extraction unit 66 instructs the carrier sensing unit 62 to carry out carrier sensing.

The carrier sensing unit 62 receives, from the extraction unit 66, the timing of frame and subframes and the information on the inter-vehicular transmission period. The carrier sensing unit 62 measures an interference power by performing carrier sensing in the inter-vehicular transmission period. Also, the carrier sensing unit 62 determines the transmission timing in the inter-vehicular transmission period, based on the interference power measured. More specifically, the carrier sensing unit 62 stores beforehand a predetermined threshold value and compares the interference power against the threshold value. If the interference power is smaller than the threshold value, the carrier sensing unit 62 will determine the transmission timing. If the execution of carrier sensing is instructed from the extraction unit 66, the carrier sensing unit 62 will execute CSMA without regard to the frame construction and thereby determine the transmission timing. The carrier sensing unit 62 conveys the thus determined transmission timing to the generator 64.

The acquiring unit 72 includes a GPS receiver, a gyro sensor, a vehicle speed sensor, and so forth all of which are not shown. The acquiring unit 72 acquires the present position, traveling direction, traveling speed and so forth of a not-shown vehicle 12, namely the vehicle 12 carrying the terminal apparatus 14, based on data supplied from the aforementioned not-shown components of the acquiring unit 72. Hereinafter the present position, traveling direction, traveling speed and so forth will be generically referred to as "positional information" or "position information". The present position thereof is indicated by the latitude and longitude. Known art may be employed to acquire them and therefore the description thereof is omitted here. The acquiring unit 72 outputs the positional information to the generator 64.

The transfer decision unit 68 controls the transfer of the message headers. The transfer decision unit 68 extracts the message headers from the packet signal. Where the packet signal is directly sent from the base station apparatus 10, the number of reuses is set to "0". If the packet signal is sent from the other terminal apparatuses 14, the number of reuses will be set to "1 or greater". The transfer decision unit 68 selects a message header to be transferred, from the extracted message headers. For example, a message header whose number of reuses is the minimum is selected. Also, the transfer decision unit 68 may generate a new message header by combining the contents contained in a plurality of message headers. The transfer decision unit 68 outputs the message header to be selected, to the generator 64. In so doing, the transfer decision unit 68 increases the number of reuses by "1".

The generator 64 receives the positional information from the acquiring unit 72 and receives the message header sent from the transfer decision unit 68. The generator 64 uses the MAC frame shown in FIGS. 5A and 5B and stores the positional data in the data payload. The generator 64 generates a packets signal containing the MAC frame and transmits, by broadcast, the thus generated packet signal with the transmission timing determined by the carrier sensing unit 62, via the modem unit 54, the RF unit 52, and the antenna 50. Note that the transmission timing is included in the inter-vehicular transmission period.

The measurement unit 80 measures the received power of packet signals received by the RF unit 52 and the modem unit 54. Though known art may be used for the measurement of the received power thereof and therefore the description thereof is omitted, the received power may be measured in units of OFDM symbol, for instance. The measurement result is successively outputted to the monitoring unit 82 and the notification unit 70. The monitoring unit 82 receives the measurement result of the received powers from the measurement unit 80. The monitoring unit 82 monitors the variation in the received powers measured by the measurement unit 80. More specifically, the monitoring unit 82 successively calculates the differences of received powers at adjacent measurement timings. In so doing, the differences thereof may be filtered to smooth the variation in the received powers. The monitoring unit 82 outputs the calculated differences to the notification unit 70.

The notification unit 70 acquires the packet signal sent from the not-shown base station apparatus 10 in the road-to-vehicle transmission period and also acquires the packet signals sent from the not-shown other terminal apparatuses 14. Note that the information regarding an apparatus, which is the sender of a packet signal, is contained in said packet signal. The information regarding the apparatus that has sent said packet indicates whether the sender is any one of the base station apparatus 10, the terminal apparatus 14 mounted on the vehicle 12 and the terminal apparatus 14 carried by the pedestrian. If the sender of the packet signal acquired is the terminal apparatus 14 mounted on the vehicle 12, the notification unit 70 will convey the approach or the like of the not-shown other vehicles 12 to the driver via a monitor or speaker according to the content of the data stored in the packet signal.

Also, the notification unit 70 receives the measurement result of the received powers from the measurement unit 80 and also receives the differences from the monitoring unit 82. If the sender of the packet signal acquired is the terminal apparatus 14 carried by the pedestrian and if the measurement result of the received power is larger than or equal to the first threshold value, the notification unit 70 will convey the approach or the like of the not-shown pedestrian to the driver via the monitor or speaker according to the content of the data stored in the packet signal. If the measurement result of the received power is smaller than the first threshold value and if the received power increases in such a manner that the difference is larger than the second threshold value, the notification unit 70 will start to convey information reflecting the content of the data stored in the packet signal. This notification is done by displaying the information on a display screen, too. For example, an icon may be displayed on a navigation screen and/or an enlarged display of a map near the intersection may be presented. The control unit 58 controls the entire operation of the terminal apparatus 14.

Figure 7:
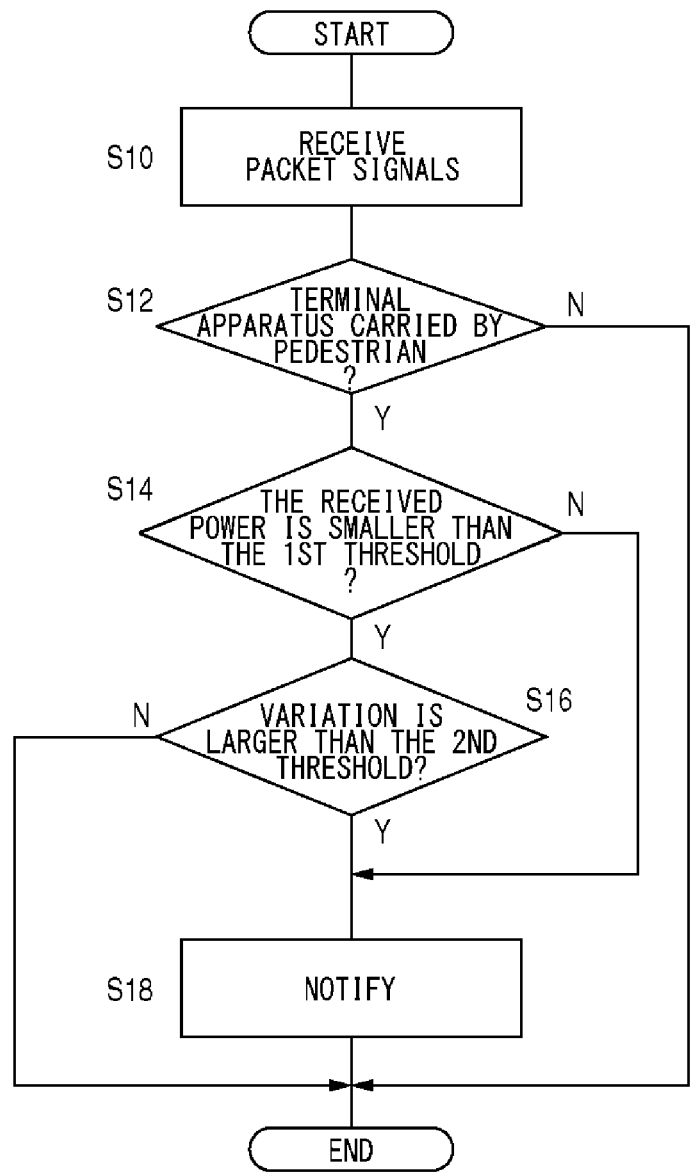
FIG. 7 is a flowchart showing a procedure in which the terminal apparatus of FIG. 6 sends a notification.

An operation of the communication system 100 configured as above is now described. FIG. 7 is a flowchart showing a procedure in which a terminal apparatus 14 sends a notification. The RF unit 52 and the modem unit 54 receive packet signals (S10). If the sender of the packet signals received is a terminal apparatus 14 carried by a pedestrian (Y of S12), if the received power thereof is smaller than the first threshold value (Y of S14) and if the variation is larger than the second threshold value (Y of S16), the notification unit 70 will send the notification (S18). If the received power is not smaller than the first threshold value (N of S14), the notification unit 70 will send the notification (S18). If the sender thereof is not the terminal apparatus 14 carried by the pedestrian (N of S12) or if the variation is not larger than the second threshold value (N of S16), the processing will be terminated.

A description is now given of a modification to the exemplary embodiments. The present modification relates also to a communication system that carries out the inter-vehicular communication and the road-to-vehicle communication. A purpose of the present modification is to not only give a warning as early as possible even though the received power is smaller than a threshold value but also improve the capability of giving an early warning. Similar to the exemplary embodiments, even if the received power of packet signals is small but if the received power increases in such a manner that the variation in the received power is larger than a threshold value, a terminal apparatus according to the present modification will output a warning. Further, the terminal apparatus restricts the output of warning when the risk is high, in order to improve the capability of giving an early warning. Accordingly, the terminal apparatus according to the present modification outputs a warning only when the illumination apparatus mounted on the vehicle is being lit. This is because it is a circumstance where the driver is more likely to miss the pedestrian(s) walking.

Figure 8:
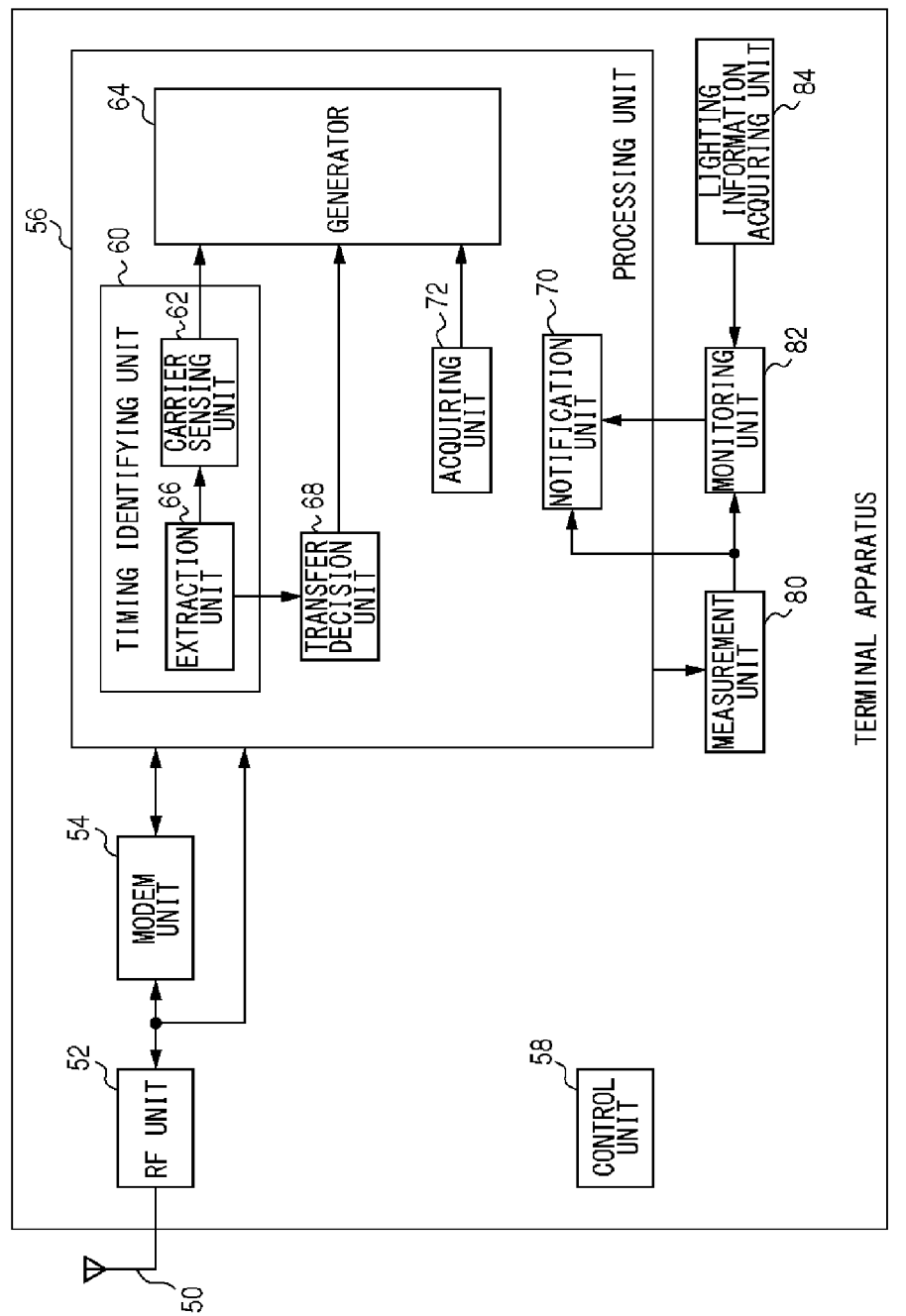
FIG. 8 shows a structure of a terminal apparatus according to a modification.

FIG. 8 shows a structure of a terminal apparatus 14 according to the present modification. As compared with the terminal apparatus 14 of FIG. 6, a lighting information acquiring unit 84 is added. A description is given here centering around features different from those of FIG. 6. The not-shown vehicle 12 is equipped with an illumination apparatus such as headlamps. The lighting information acquiring unit 84, which connects to the illumination apparatus, acquires information concerning the lighting status of the illumination apparatus. The information concerning the lighting status of the illumination apparatus indicates whether the headlamps are lit or not. The lighting information acquiring unit 84 may acquire the information concerning the lighting status of the illumination apparatus through an input from the driver. The monitoring unit 82 receives from the lighting information acquiring unit 84 the information concerning the lighting status of the illumination apparatus. The monitoring unit 82 outputs the information concerning the lighting status of the illumination apparatus, together with the calculated differences, to the notification unit 70. If the sender of the packet signals acquired is a terminal apparatus 14 carried by a pedestrian, if the measurement result of the received power is smaller than the first threshold value, if the received power increases in such a manner that the difference fed from the monitoring unit 82 is larger than the second threshold value and if the information acquired by the lighting information acquiring unit 84 indicates that the headlamps are lit, the notification unit 70 will start to send a notification.

Figure 9:
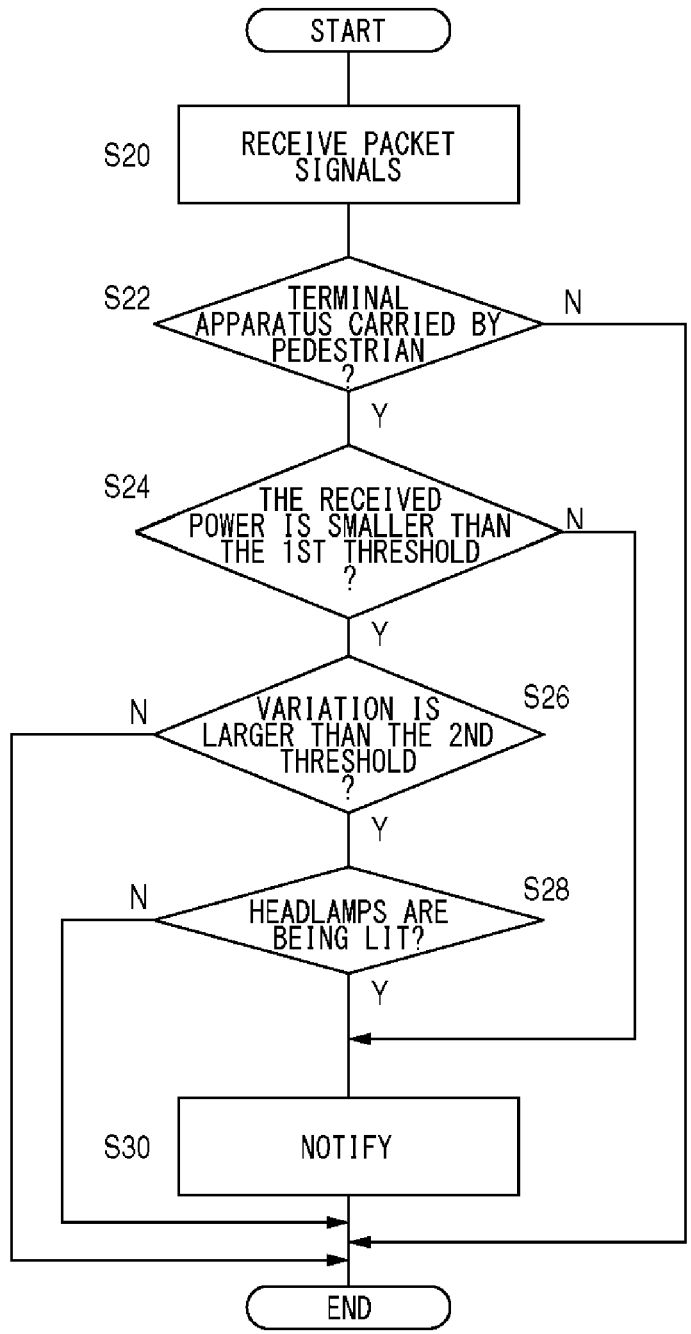
FIG. 9 is a flowchart showing a procedure in which the terminal apparatus of FIG. 8 sends a notification.

An operation of the communication system 100 configured as above is now described. FIG. 9 is a flowchart showing a procedure in which a terminal apparatus 14 sends a notification. The RF unit 52 and the modem unit 54 receive packet signals (S20). If the sender of the packet signals received is a terminal apparatus 14 carried by a pedestrian (Y of S22), if the received power thereof is smaller than the first threshold value (Y of S24), if the variation is larger than the second threshold value (Y of S26) and if the headlamps are being lit (Y of S28), the notification unit 70 will send the notification (S30). If the received power is not smaller than the first threshold value (N of S24), the notification unit 70 will send the notification (S30). If the sender thereof is not the terminal apparatus 14 carried by the pedestrian (N of S22) or if the variation is not larger than the second threshold value (N of S26) or if the headlamps are not lit (N of S28), the processing will be terminated.

A description is now given of another modification to the exemplary embodiments. The present modification relates also to a communication system that carries out the inter-vehicular communication and the road-to-vehicle communication. A purpose of the present modification is to not only give a warning as early as possible even though the received power is smaller than a threshold value but also suppress useless warnings. Similar to the exemplary embodiments, even if the received power of packet signals is small but if the received power increases in such a manner that the variation in the received power is larger than a threshold value, a terminal apparatus according to the present modification will output a warning. Further, the terminal apparatus will not output the warning if the vehicle is not moving. This is because there is no risk of the vehicle hitting the pedestrian if the vehicle is at a stop.

Figure 10:
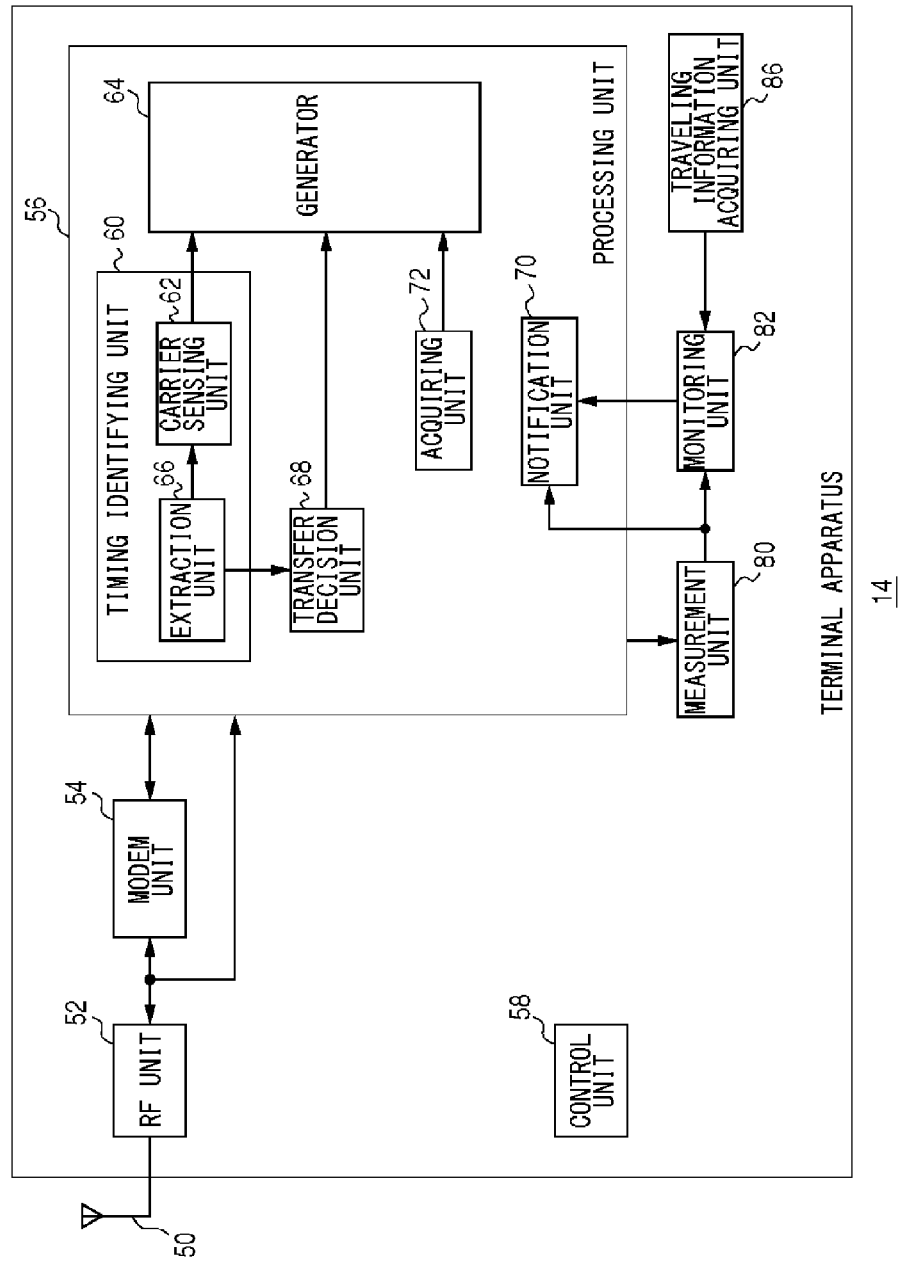
FIG. 10 shows a structure of a terminal apparatus according to another modification.

FIG. 10 shows a structure of a terminal apparatus 14 according to another modification. As compared with the terminal apparatus 14 of FIG. 6, a traveling information acquiring unit 86 is added. A description is given here centering around features different from those of FIG. 6. The not-shown vehicle 12 is equipped with a velocity sensor. The traveling information acquiring unit 86, which is mounted on a vehicle 12, acquires information concerning the running conditions of the vehicle 12. The information concerning the running conditions thereof indicates the running velocity of the vehicle 12. The monitoring unit 82 receives from the traveling information acquiring unit 86 the information concerning the running conditions. The monitoring unit 82 outputs the information concerning the running conditions, together with the calculated differences, to the notification unit 70. If the sender of the packet signals acquired is a terminal apparatus 14 carried by a pedestrian, if the measurement result of the received power is smaller than the first threshold value, if the received power increases in such a manner that the difference fed from the monitoring unit 82 is larger than the second threshold value and if the information acquired by the traveling information acquiring unit 86 does not indicate that the vehicle 12 is at a stop, the notification unit

70 will start to send a notification. If the information acquired by the traveling information acquiring unit 86 indicates that the vehicle 12 is at a stop, the notification unit 70 will not start sending a notification.

Figure 11:
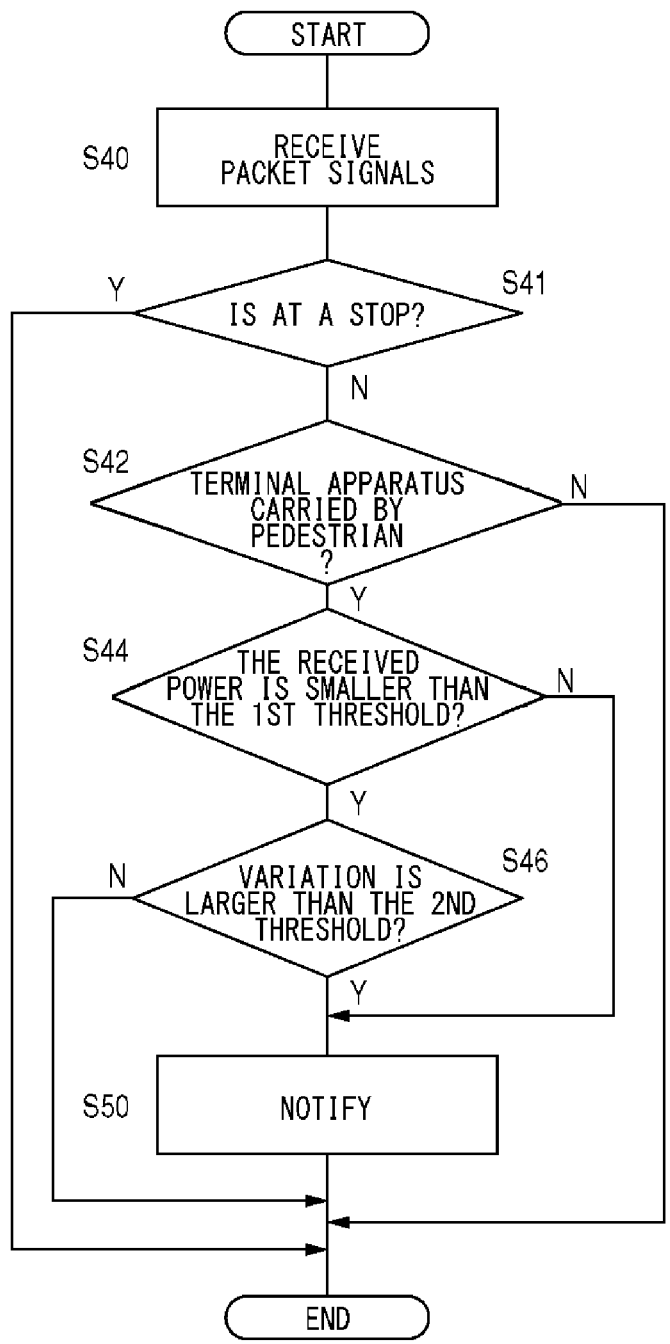
FIG. 11 is a flowchart showing a procedure in which the terminal apparatus of FIG. 10 sends a notification.

An operation of the communication system 100 configured as above is now described. FIG. 11 is a flowchart showing a procedure in which a terminal apparatus 14 sends a notification. The RF unit 52 and the modem unit 54 receive packet signals (S40). If the vehicle 12 is not at a stop (N of S41), if the sender of the packet signals received is a terminal apparatus 14 carried by a pedestrian (Y of S42), if the received power thereof is smaller than the first threshold value (Y of S44) and if the variation is larger than the second threshold value (Y of S46), the notification unit 70 will send the notification (S50). If the received power is not smaller than the first threshold value (N of S44), the notification unit 70 will send the notification (S50). If the vehicle 12 is at a stop (Y of S41) or if the sender thereof is not the terminal apparatus 14 carried by the pedestrian (N of S42) or if the variation is not larger than the second threshold value (N of S46), the processing will be terminated.

A description is now given of still another modification to the exemplary embodiments. The present modification relates also to a communication system that carries out the inter-vehicular communication and the road-to-vehicle communication. A purpose of the present modification is to not only give a warning as early as possible even though the received power is smaller than a threshold value but also improve the capability of giving an early warning. Similar to the exemplary embodiments, even if the received power of packet signals is small but if the received power increases in such a manner that the variation in the received power is larger than a threshold value, a terminal apparatus according to the present modification will output a warning. Further, the terminal apparatus restricts the output of warning when the risk is high, in order to improve the capability of giving an early warning. Accordingly, the terminal apparatus according to the present modification outputs a warning only when the width of a road is narrow. This is because a pedestrian who runs out in the road has a higher risk of being hit by a vehicle.

Figure 12:
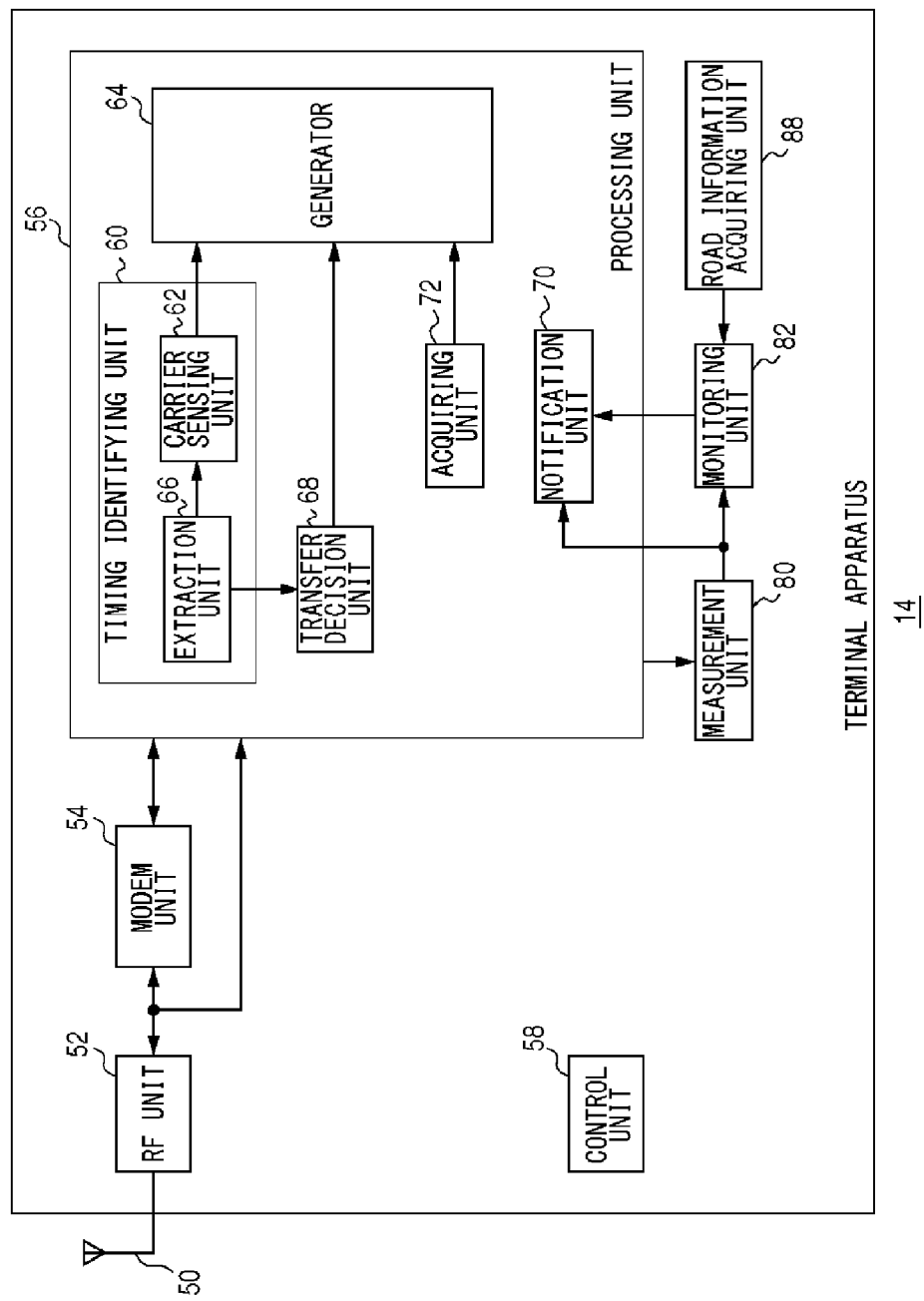
FIG. 12 shows a structure of a terminal apparatus according to still another modification.

FIG. 12 shows a structure of a terminal apparatus 14 according to still another modification. As compared with the terminal apparatus 14 of FIG. 6, a road information acquiring unit 88 is added. A description is given here centering around features different from those of FIG. 6. The not-shown vehicle 12 is equipped with a car navigation system. The car navigation system stores information on roads, such as information on the widths of roads. The road information acquiring unit 88 acquires from the car navigation system the information concerning a road along which the vehicle 12 is traveling. If the road is narrow, there may be cases where no information regarding the width of the road is stored. In such a case, the road information acquiring unit 88 will obtain the information indicating that no information is available, as the information on the road.

The monitoring unit 82 receives the information on the road. The monitoring unit 82 outputs the information on the road, together with the calculated differences, to the notification unit 70. If the sender of the packet signals acquired is a terminal apparatus 14 carried by a pedestrian, if the measurement result of the received power is smaller than the first threshold value, if the received power increases in such a manner that the difference fed from the monitoring unit 82 is larger than the second threshold value and if the information on the road indicates that the width of the road is less than a predetermined width, the notification unit 70 will start to send a notification. If the information on the road indicates that no information on the width of the road is available, the notification unit 70 will estimate that the width of the road is less than the predetermined width.

Figure 13:
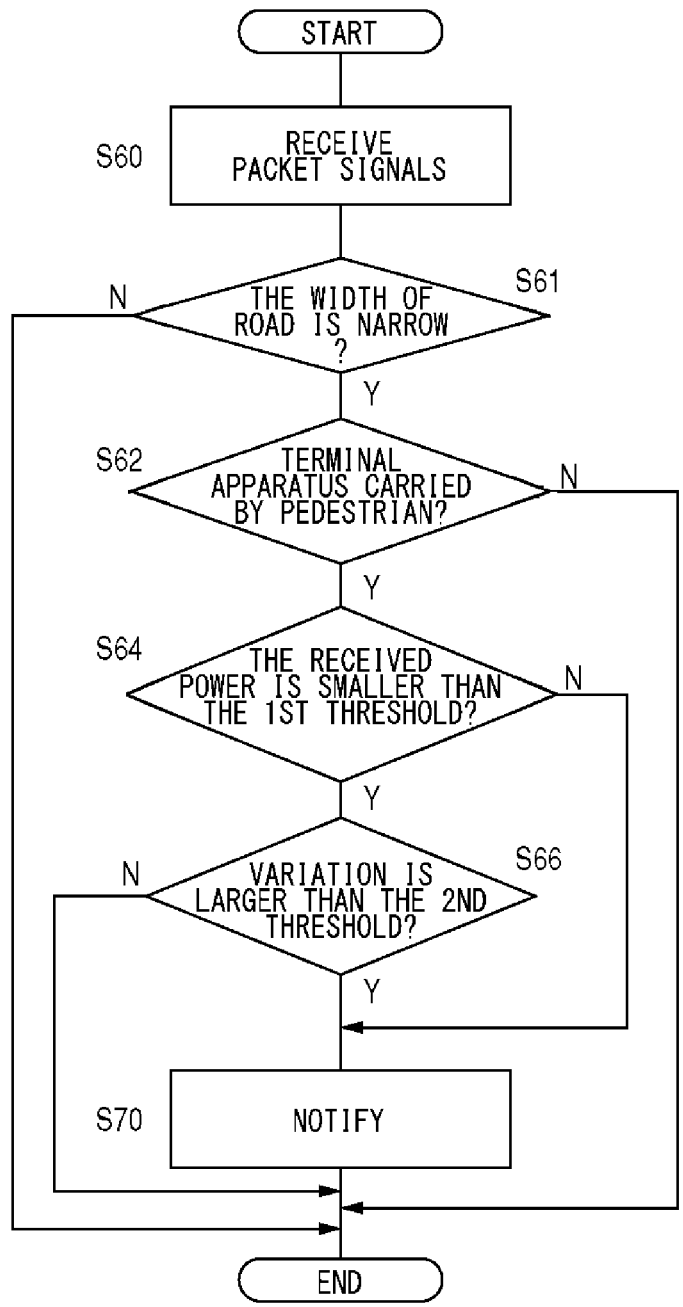
FIG. 13 is a flowchart showing a procedure in which the terminal apparatus of FIG. 12 sends a notification.

An operation of the communication system 100 configured as above is now described. FIG. 13 is a flowchart showing a procedure in which a terminal apparatus 14 sends a notification. The RF unit 52 and the modem unit 54 receive packet signals (S60). If the width of a road is narrow (Y of S61), if the sender of the packet signals received is a terminal apparatus 14 carried by a pedestrian (Y of S62), if the received power thereof is smaller than the first threshold value (Y of S64) and if the variation is larger than the second threshold value (Y of S66), the notification unit 70 will send the notification (S70). If the received power is not smaller than the first threshold value (N of S64), the notification unit 70 will send the notification (S70). If the width of the road is not narrow (N of S61) or if the sender thereof is not the terminal apparatus 14 carried by the pedestrian (N of S62) or if the variation is not larger than the second threshold value (N of S66), the processing will be terminated.

A description is now given of still another modification to the exemplary embodiments. The present modification relates also to a communication system that carries out the inter-vehicular communication and the road-to-vehicle communication. A purpose of the present modification is to not only give a warning as early as possible even though the received power is smaller than a threshold value but also improve the capability of giving an early warning. Similar to the exemplary embodiments, even if the received power of packet signals is small but if the received power increases in such a manner that the variation in the received power is larger than a threshold value, a terminal apparatus according to the present modification will output a warning. Further, the terminal apparatus restricts the output of warning when the risk is high, in order to improve the capability of giving an early warning. Accordingly, the terminal apparatus according to the present modification generates image data of a road ahead and then outputs a warning only when an image of any pedestrian is included in the image data.

Figure 14:
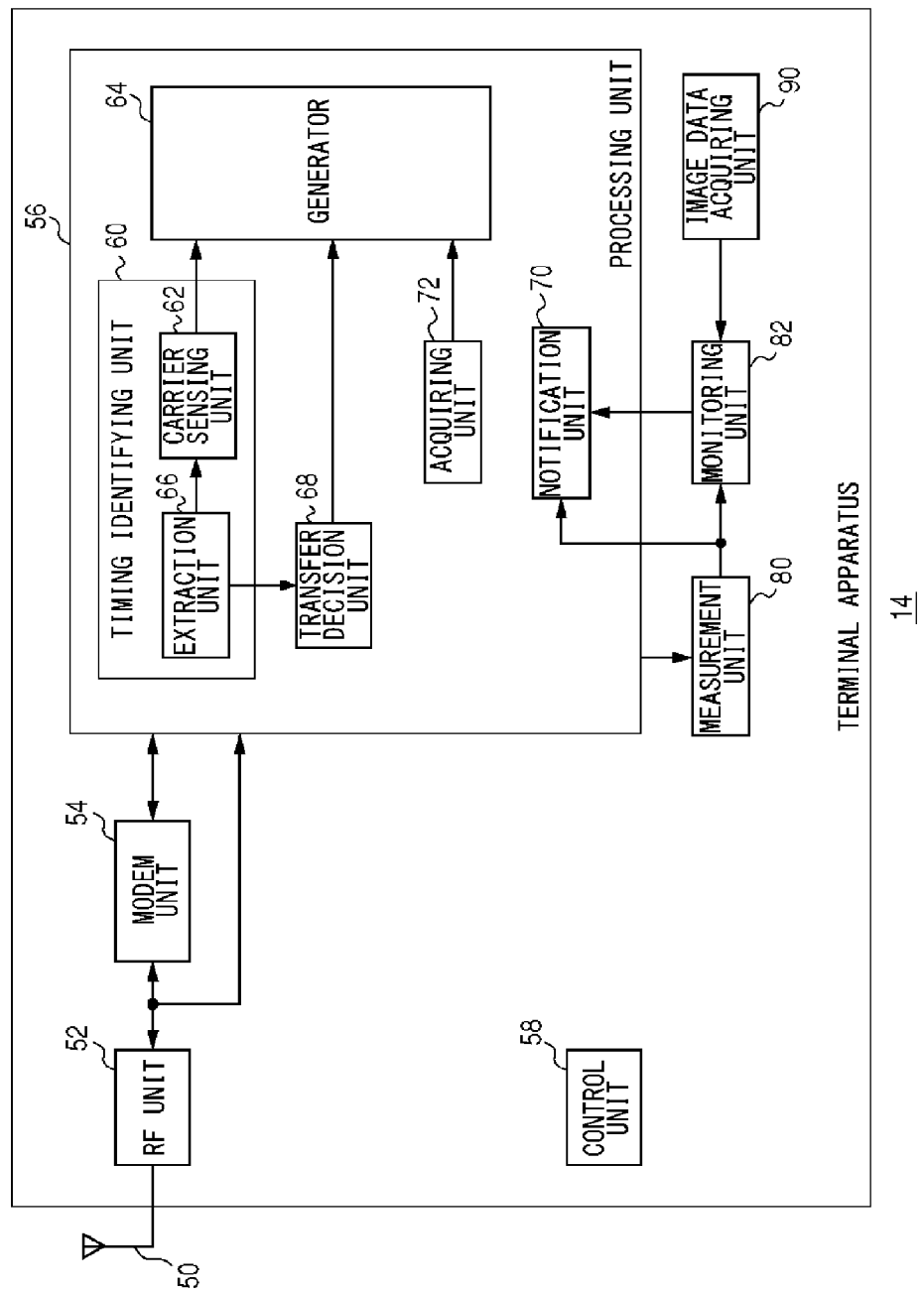
FIG. 14 shows a structure of a terminal apparatus according to still another modification.

FIG. 14 shows a structure of a terminal apparatus 14 according to still another modification. As compared with the terminal apparatus 14 of FIG. 6, an image data acquiring unit 90 is added. A description is given here centering around features different from those of FIG. 6. The not-shown vehicle 12 is equipped with an image pickup apparatus for taking images of a road in front of the traveling vehicle 12. The image pickup apparatus takes the images of the road ahead so as to generate the image data. The image data may be moving images or a plurality of still images captured successively. The image data acquiring unit 90 acquires from the image pickup apparatus the image data of the road in front of the traveling vehicle 12. The monitoring unit 82 receives the image data from the image data acquiring unit 90. The monitoring unit 82 outputs the image data, together with the calculated differences, to the notification unit 70.

The notification unit 70 includes a not-shown analysis unit. The analysis unit analyzes the content of image data acquired by the image data acquiring unit 90 and then identifies whether any pedestrian is included in the image data or not. Known art may be employed to analyze the image data and therefore the description thereof is omitted here. If the sender of the packet signals acquired is a terminal apparatus 14 carried by the pedestrian, if the measurement result of the received power is smaller than the first threshold value, if the received power increases in such a manner that the difference fed from the monitoring unit 82 is larger than the second threshold value and if the pedestrian is included in the image data analyzed by the analysis unit, the notification unit 70 will start to send a notification.

Figure 15:
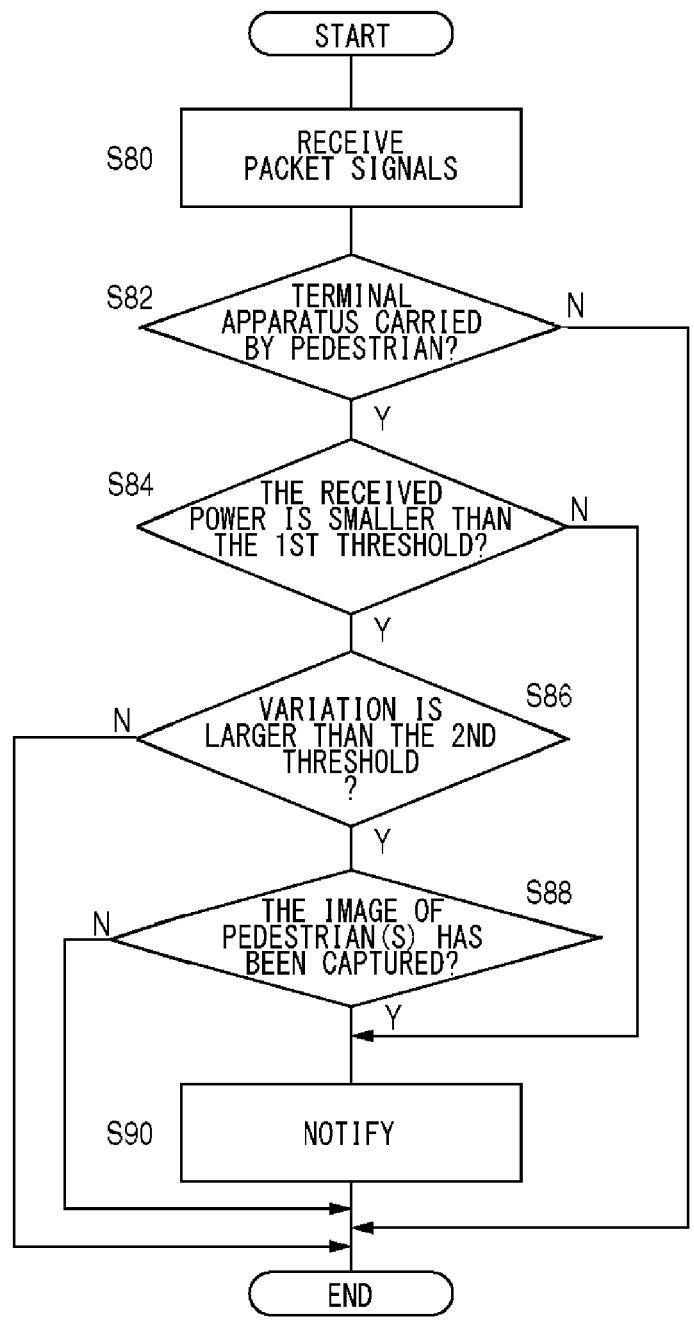
FIG. 15 is a flowchart showing a procedure in which the terminal apparatus of FIG. 14 sends a notification.

An operation of the communication system 100 configured as above is now described. FIG. 15 is a flowchart showing a procedure in which a terminal apparatus 14 sends a notification. The RF unit 52 and the modem unit 54 receive packet signals (S80). If the sender of the packet signals received is a terminal apparatus 14 carried by a pedestrian (Y of S82), if the received power thereof is smaller than the first threshold value (Y of S84), if the variation is larger than the second threshold value (Y of S86) and if the image of pedestrian has been captured (Y of S88), the notification unit 70 will send the notification (S90). If the received power is not smaller than the first threshold value (N of S84), the notification unit 70 will send the notification (S90). If the sender thereof is not the terminal apparatus 14 carried by the pedestrian (N of S82) or if the variation is not larger than the second threshold value (N of S86) or if no pedestrians has been captured in the image data (N of S88), the processing will be terminated.

By employing the exemplary embodiments of the present invention, when the received power of packet signals increases in such a manner that the variation is larger than a threshold value, sending the information reflecting the content of the packet signals starts. Thus the situation where a pedestrian has entered the driver's sight line from an unseen area can be promptly detected. Also, since the situation where the pedestrian has entered the driver's sight line from the unseen area is quickly detected, the presence of a pedestrian carrying a terminal apparatus that is at high risk can be notified. Also, when the illumination apparatus is being lit, the start of sending a notification is restricted, so that the opportunity to give warnings can be restricted. Also, since the opportunity to give warnings is restricted, the capability of giving an early warning can be kept. If the vehicle is at a stop, sending a notification will not start, so that giving unnecessary warnings can be suppressed. Also, if the vehicle is traveling along a road whose width is less than the predetermined width, the start of sending a notification will be restricted, so that the opportunity to give warnings can be restricted. Also, if the image of any pedestrian is contained in the image data, sending a notification will be restricted, so that the opportunity to give warnings can be restricted.

The present invention has been described based on the exemplary embodiments and their modifications. The exemplary embodiments are intended to be illustrative only, and it is understood by those skilled in the art that further various modifications to constituting elements and processes as well as arbitrary combinations thereof could be further developed and that such modifications and combinations are also within the scope of the present invention.

In the exemplary embodiments of the present invention, the notification unit 70 gives a warning when the packet signals are received from the terminal apparatus 14 mounted on the vehicle 12. However, this should not be considered as limiting. If, for example, even though the packet signals are received from the terminal apparatus 14 mounted on the vehicle 12, the notification unit 70 may make a conditional determination similarly to the case where the packet signals are received from the terminal apparatus 14 carried by the pedestrian and then start to send a notification. By employing this modification, the opportunity to give warnings can be restricted even if the packet signals have been received from the terminal apparatus 14 mounted on the vehicle 12.

In still another modification described above, the road information acquiring unit 88 acquires the information on roads from the car navigation system. However, this should not be considered as limiting and, for example, the road information acquiring unit 88 may obtain the information on roads by analyzing the data of images taken by the image pickup apparatus. Known art may be employed to analyze the image data and therefore the description thereof is omitted here. According to this modification, the terminal apparatus 14 can be designed more freely.

In still another modification described above, the notification unit 70 determines whether a warning is to be given or not, according to the width of a road. However, this should not be considered as limiting and, for example, the method of notification may be varied depending on the width of a road. More specifically, when the width of the road gets narrow, the notification unit 70 sends a notification by displaying such information on a display or the like; when the width of the road gets narrower, the notification unit 70 sends a notification through both display and audio. According to this modification, information on the degree of risk can be conveyed to the driver.

A terminal apparatus 14 may be provided with a plurality of antennas and thereby estimate the arrival directions of packet signals sent from other terminal apparatuses 14. The notification unit 70 determines whether a warning is to be given or not, based on the arrival directions.

It has been assumed in the above description that a terminal apparatus 14 is mounted in a vehicle 12 and is particularly mounted fixedly on the vehicle 12. However, this should not be considered as limiting and, for example, the terminal apparatus 14 may be detachably mounted on the vehicle 12. When the terminal apparatus 14 is mounted in the vehicle 12, the lighting information acquiring unit 84 of FIG. 8, the traveling information acquiring unit 86 of FIG. 10, the road information acquiring unit 88 of FIG. 12, and the image data acquiring unit 90 of FIG. 14 are all connected to connection terminals provided in the vehicle 12. According to this modification, the terminal apparatus 14 may be configured as a portable unit.

What is claimed is:

1. A radio apparatus comprising:
   a receiving unit configured to receive a packet signal sent from another radio apparatus;
   a processing unit configured to process the packet signal received by said receiving unit;
   a measurement unit configured to measure a received power of the packet signal received by said receiving unit;
   a monitoring unit configured to monitor a variation in the received power measured by said measurement unit; and
   a notification unit configured to send a notification such that,
      when the received power measured by said measurement unit is smaller than a first threshold value and when the received power increases in such a manner that the variation monitored by said monitoring unit is larger than a second threshold value, said notification unit starts to convey information reflecting content of the packet signal processed by said processing unit, and
      when the received power measured by said measurement unit is larger than or equal to the first threshold value, said notification unit starts to convey the information reflecting content of the packet signal processed by said processing unit, regardless of the variation monitored by said monitoring unit.

2. A radio apparatus according to claim 1, further comprising a lighting information acquiring unit configured to acquire information concerning a lighting status of an illumination apparatus provided in a vehicle, when the radio apparatus is mounted on the vehicle, wherein, when the received power increases in such a manner that the variation monitored by said monitoring unit is larger than the second threshold value and when the information acquired by said lighting information acquiring unit indicates that the illumination apparatus is lit, the notification unit starts to send the notification.

3. A radio apparatus according to claim 1, further comprising a traveling information acquiring unit configured to acquire information concerning running conditions of a vehicle, when the radio apparatus is mounted on the vehicle, wherein, when the received power increases in such a manner that the variation monitored by said monitoring unit is larger than the second threshold value and when the information acquired by said traveling information acquiring unit indicates that the vehicle is at a stop, the notification unit does not start sending the notification.

4. A radio apparatus according to claim 1, further comprising a road information acquiring unit configured to acquires information concerning a road along which a vehicle is traveling, when the radio apparatus is mounted on the vehicle, wherein, when the received power increases in such a manner that the variation monitored by said monitoring unit is larger than the second threshold value and when the information acquired by said road information acquiring unit indicates that the width of the road is less than a predetermined width, the notification unit starts to send the notification.

5. A radio apparatus according to claim 1, further comprising:

an image data acquiring unit configured to acquire data of picked-up image in front of a traveling vehicle, when the radio apparatus is mounted on the vehicle; and an analysis unit configured to analyze content of the image data acquired by said image data acquiring unit, wherein, when the received power increases in such a manner that the variation monitored by said monitoring unit is larger than the second threshold value and when an image of any pedestrian is included in the image data analyzed by said analysis unit, the notification unit starts to send the notification.

6. A radio apparatus according to claim 1, wherein the notification unit sends the notification by displaying the information on a display screen.

\* \* \* \* \*